(12) United States Patent
Fan et al.

(10) Patent No.: US 6,388,898 B1
(45) Date of Patent: May 14, 2002

(54) DC/DC POWER PROCESSOR WITH DISTRIBUTED RECTIFIER STAGE

(75) Inventors: Heng-Chia Fan; Ko-Yu Hsiao, both of Chungli (TW); Milan Jovanovic, Cary, NC (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/767,637

(22) Filed: Jan. 22, 2001

(51) Int. Cl.[7] .......................... H02M 3/335; H02M 5/42
(52) U.S. Cl. .................... 363/20; 363/17; 363/89
(58) Field of Search .......................... 363/20, 17, 97, 363/98, 131, 132, 89

(56) References Cited

U.S. PATENT DOCUMENTS

| | | | | |
|---|---|---|---|---|
| 3,654,537 A | * | 4/1972 | Coffey | 320/166 |
| 4,445,166 A | * | 4/1984 | Berglund | 363/48 |
| 4,673,888 A | * | 6/1987 | Englemanns et al. | 330/10 |
| 5,500,791 A | * | 3/1996 | Kheraluwala et al. | 363/17 |
| 5,541,827 A | * | 7/1996 | Allfather | 363/17 |
| 6,118,679 A | * | 9/2000 | Smith | 363/70 |
| 6,272,027 B1 | * | 8/2001 | Fraidlin et al. | 363/26 |

* cited by examiner

*Primary Examiner*—Rajnikant B. Patel
(74) *Attorney, Agent, or Firm*—Skjerven Morrill MacPherson LLP; Edward C. Kwok

(57) ABSTRACT

A technique, which substantially reduces the number of power-stage and control circuit components in an isolated DC/DC converter with parallel current-doubler rectifier stages, includes on the primary side transformers with serially connected primary windings each having a corresponding secondary winding coupled to one of the voltage-doubler stages. In one embodiment, the primary and secondary windings and filter inductors of the current-doubler rectifier stages are provided on an integrated magnetic core. The filter inductors in each current-doubler rectifier stage can be provided as coupled inductors. In one embodiment, an X-shaped magnetic core is provided to achieve coupled or uncoupled filter inductors.

16 Claims, 8 Drawing Sheets

DC/DC POWER PROCESSOR WITH DISTRIBUTED RECTIFIER STAGE

BACKGROUND OF THE INVENTION

1. Field of the Invention

This invention relates to isolated dc/dc converters. In particular, this invention relates to low output voltage, high output current, isolated dc/dc converters that has multiple rectifier stages connected in parallel.

2. Discussion of the Related Art

In a high-power application, by connecting several substantially identical converter power stages in a parallel configuration to share the total power processed, one can often achieve a desired output power using smaller, lower-rated magnetic and semiconductor components. With several power stages connected in parallel, the power losses and thermal stresses on the magnetic and semiconductor components are distributed among the parallel power stages, thus improving conversion efficiency and eliminating "hot spots". In addition, because lower-power, faster semiconductor switches can be used to implement the parallel power stages, the parallel power stages may be operated at a higher switching frequency than that of a corresponding single high-power stage. Consequently, the parallel configuration reduces the required sizes of the magnetic components and increases conversion power density. In addition, because the parallel power stages can be operated at a higher switching frequency, this approach can be used to optimize the transient response of a power supply.

FIG. 1 shows converter 100 with two forward-converter power stages 101 and 102 connected in parallel. Generally, a power supply with parallel power stages requires more power stage and control circuit components. However, if the parallel converters share the same output filter, the number of power stage components can be reduced, such as illustrated by converter 200 of FIG. 2. Similarly, if transformer secondary windings are provided directly in parallel, required power stage components can also be reduced, such as illustrated by converter 300 of FIG. 3. Converters 200 and 300 of FIGS. 2 and 3 are discussed in "Analysis, Design, and Evaluation of Forward Converter with Distributed Magnetics—Interleaving and Transformer Paralleling," ("Zhang") by M. T. Zhang, M. M. Jovanovic and F. C. Lee, published in *IEEE Applied Power Electronics Conf.* (*APEC*) *Proc.*, pp. 315–321, 1995.

Regardless of the approach used in connecting power stages in parallel, ensuring that an acceptable load current (hence, power) is shared among the parallel modules is the main design challenge of such an approach. In fact, without an acceptable current-sharing mechanism, the load current can be unevenly distributed among the parallel modules. As a result, the modules that carry higher currents are electrically and thermally stressed more than the other modules, thus reducing the reliability of the power supply. Moreover, when the current of a parallel module exceeds its current limit, such as may occur when the converter current is unevenly distributed, the entire power supply may need to be shut off. Therefore, many current-sharing techniques of different complexities and performance are developed to ensure a relatively even current distribution among parallel modules. A discussion of some of these techniques is found in "A Classification and Evaluation of Paralleling Methods for Power Supply Modules," by S. Luo, Z. Ye, R. L. Lin, and F. C. Lee, published in *IEEE Power Electronics Specialists' Conf. Rec.*, pp. 901–908, 1999. For example, relatively even current sharing in converters 100 and 200 in FIGS. 1 and 2 can be achieved by equalizing the peak values of primary currents in the modules. Furthermore, the performance of converter 100 and 200 of FIGS. 1 and 2 can be further improved by interleaving (i.e., operating the primary switches in each converter with 180° phase shift). Generally, as discussed by Zhang above, interleaving provides some input current and output current ripple cancellation, thus reducing the size of the input and output filters.

Referring to FIG. 3, steady-state current sharing among parallel transformers 301 and 302 of converter 300 is determined by the winding resistances of transformers 301 and 302. Because winding resistance is usually comparable with the layout resistance, the current sharing performance of parallel transformers is sensitive to circuit layout. Sensitivity to layout resistance can be reduced by including a rectifier in the secondary side of each transformer, such as shown in converter 400 of FIG. 4. In converter 400, current sharing is determined by the on-resistances of rectifiers 401 and 402, as a rectifier's resistance is usually larger than that of a printed circuit board (PCB) trace resistance. However, because the on-resistance of silicon rectifiers has a negative temperature coefficient (i.e., the rectifier's resistance decreases as the temperature of the rectifier increases), a current runaway condition may exist. In a runaway condition, all the secondary current flows through one of the rectifiers and the associated transformer secondary windings. The runaway condition in converter 400 can be avoided if low on-resistance MOSFETs (which have positive on-resistance temperature coefficients) are used instead of the diode rectifiers, as it is routinely done in low-voltage high-current applications.

In a low output voltage (e.g., below 3.3 V), high output current (e.g., above 50 A) application that requires transformer isolation, secondary-side conduction loss dominates total loss and limits conversion efficiency. Therefore, to increase conversion efficiency, rectification and transformer winding losses must be reduced. Rectification loss can be reduced, for example, by replacing Schottky rectifiers with MOSFET synchronous rectifiers. Reduction of transformer winding loss can be achieved by reducing winding resistance and the root-mean-square (rms) current in the winding, respectively, by properly selecting the winding geometry and transformer structure, and by employing a current-doubler topology. These techniques are discussed for example in "Design and Performance Evaluation of Low-Voltage/High-Current Dc/Dc On-Board Modules," ("Panov") by Y. Panov, M. M. Jovanovic, published in *IEEE Applied Power Electronics Conf.* (*APEC*) *Proc.*, pp. 545–552, 1999, and in "The Performance of the Current Doubler Rectifier with Synchronous Rectification," by L. Balogh, published in *High Frequency Power Conversion Conf. Proc.*, pp. 216–225, 1995.

FIG. 5 shows an example of a 1.45-volt, 70-ampere dc/dc converter 500 that employs a current-doubler topology implemented with synchronous rectifiers. (Converter 500 is discussed in the Panov reference mentioned above). In converter 500, synchronous rectifier 501 and 502 are each implemented by connecting three low on-resistance MOSFETs in parallel. The technique used in converter 500, however, cannot be extended to higher current levels by simply adding more synchronous rectifier MOSFETs, because the incremental reduction in conduction losses is less than the incremental increase of switching losses due to charging and discharging of MOSFETs' relatively large intrinsic terminal capacitances. If the switching frequency were not reduced, conversion efficiency would be reduced. However, reduction of switching frequency requires an undesirable increase in the sizes of magnetic components. In addition, the packaging of a large number of paralleled synchronous rectifiers is also difficult.

The output current of converter 500 of FIG. 5 can be increased without efficiency degradation by connecting in parallel two or more power stages, as illustrated in converter 600 of FIG. 6. However, converter 600 requires significantly more power-stage and control circuit components to achieve even current (hence, power) sharing among the parallel modules. The additional components increase both the size and the cost of the converter.

SUMMARY OF THE INVENTION

According to the present invention, a parallel technique, which substantially reduces the number of power-stage and control-circuit components in an isolated dc/dc converter with a current-doubler rectifier and provides automatic current sharing is described. Using a common primary side inverter, and by providing in parallel only the secondary-side current-doubler rectifiers that are driven through separate isolation transformers, component count reduction is achieved. Current sharing among the parallel rectifier stages is achieved by connecting the primary windings of the transformers in series, thus forcing the same current through the transformers' secondary windings and the rectifiers. Additional component count reduction is achieved using integrated magnetic components. The technique of the present invention can be extended to an arbitrary number of rectifier stages, as well as to any rectifier topology.

The present invention is better understood upon consideration of the following detailed description and the accompanying drawings.

DETAILED DESCRIPTION OF THE INVENTION

Figure 1:
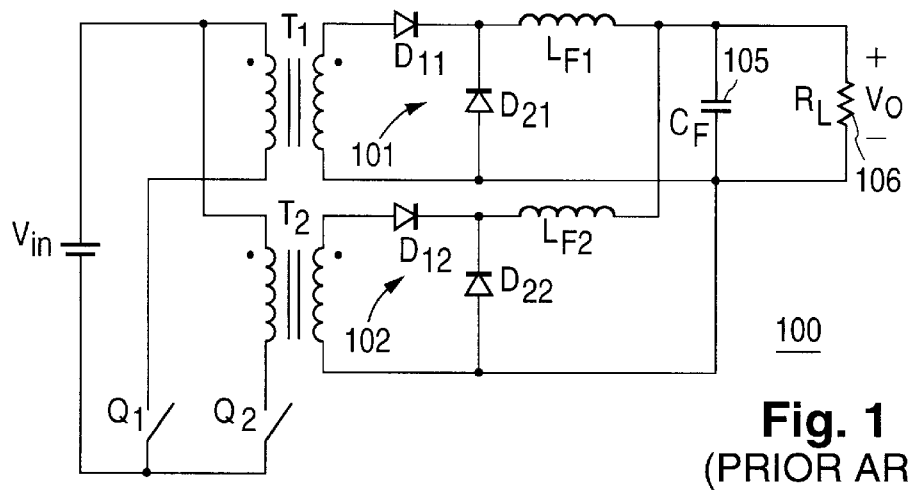
FIG. 1 shows prior art converter 100 having two forward converter stages 101 and 102 connected in parallel.
Figure 2:
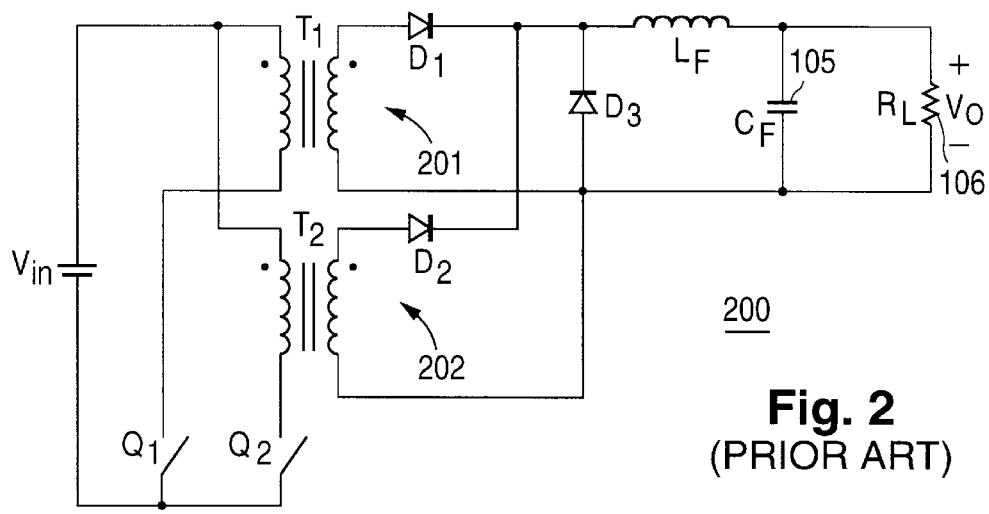
FIG. 2 shows prior art converter 200 having two forward converter stages 201 and 202 connected in parallel and sharing a common output filter.
Figure 3:
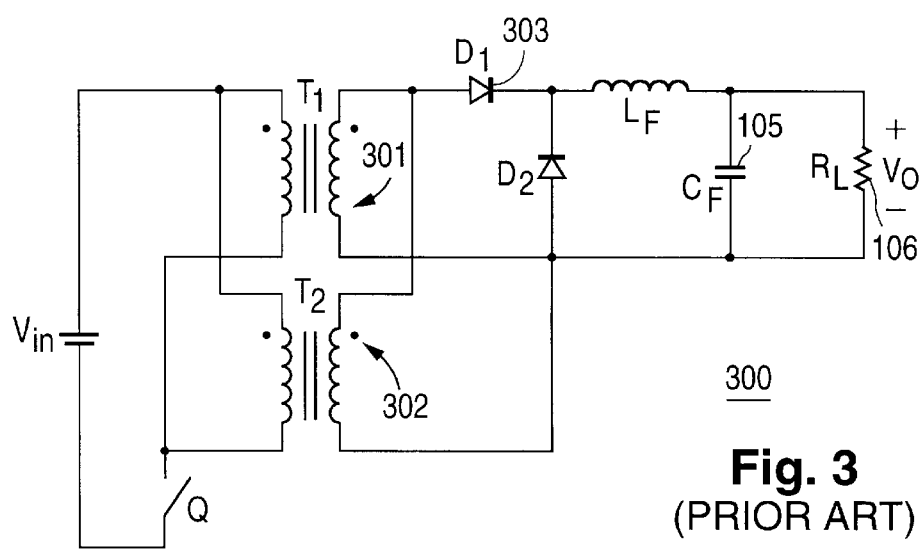
FIG. 3 shows prior art forward converter 300 having transformers 301 and 302 connected in parallel upstream to rectifier 303.
Figure 4:
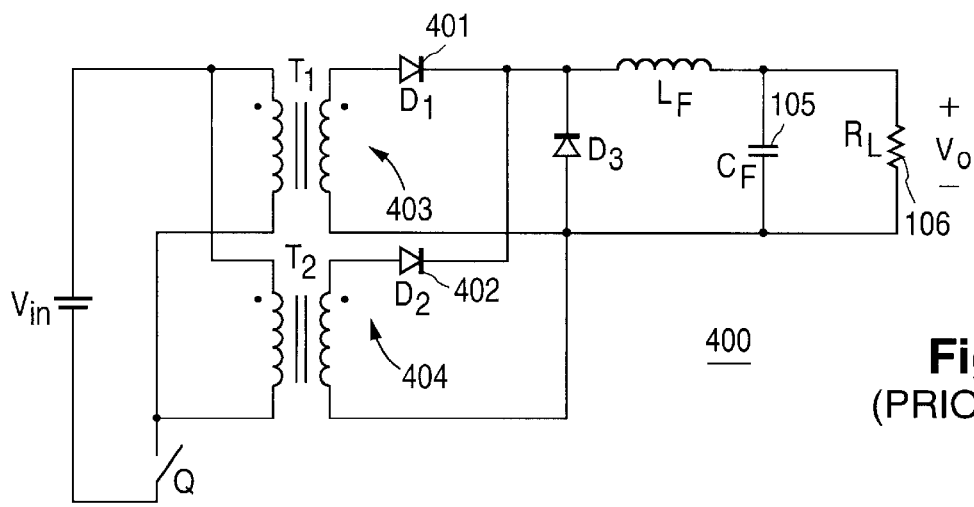
FIG. 4 shows prior art forward converter 400 having transformers 403 and 404 connected in parallel downstream from rectifiers 401 and 402.

In the detailed description below, to facilitate illustration and correspondence between figures, like elements are provided like reference numerals.

Figure 5:
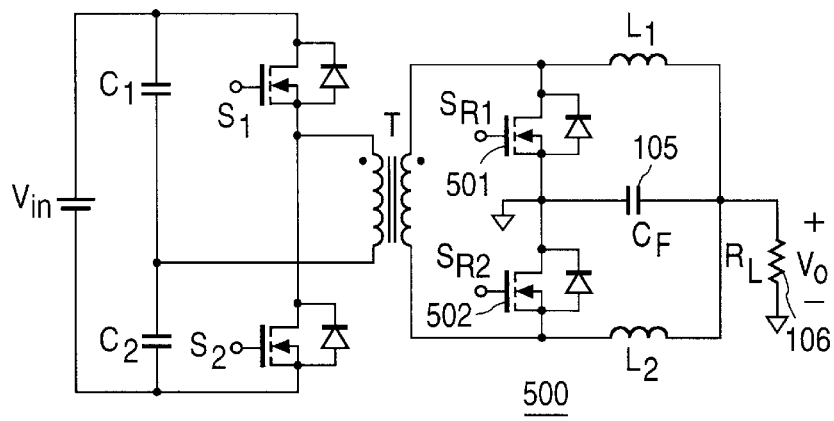
FIG. 5 shows prior art half-bridge converter 500 having a current-doubler output stage implemented by synchronous rectifiers 501 and 502.
Figure 6:
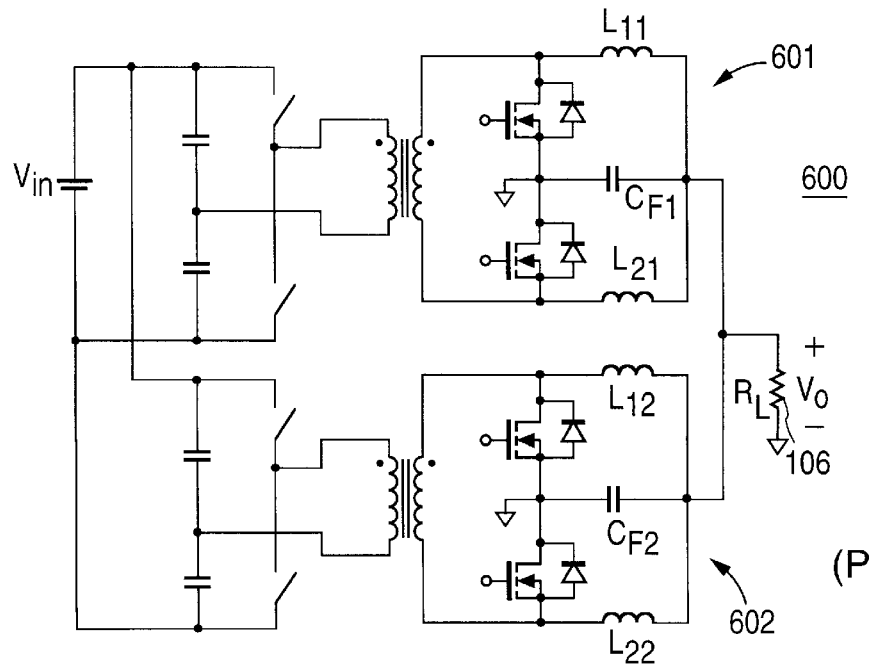
FIG. 6 shows prior art half-bridge converters 601 and 602, each having a current-doubler rectifier, connected in parallel.
Figure 7:
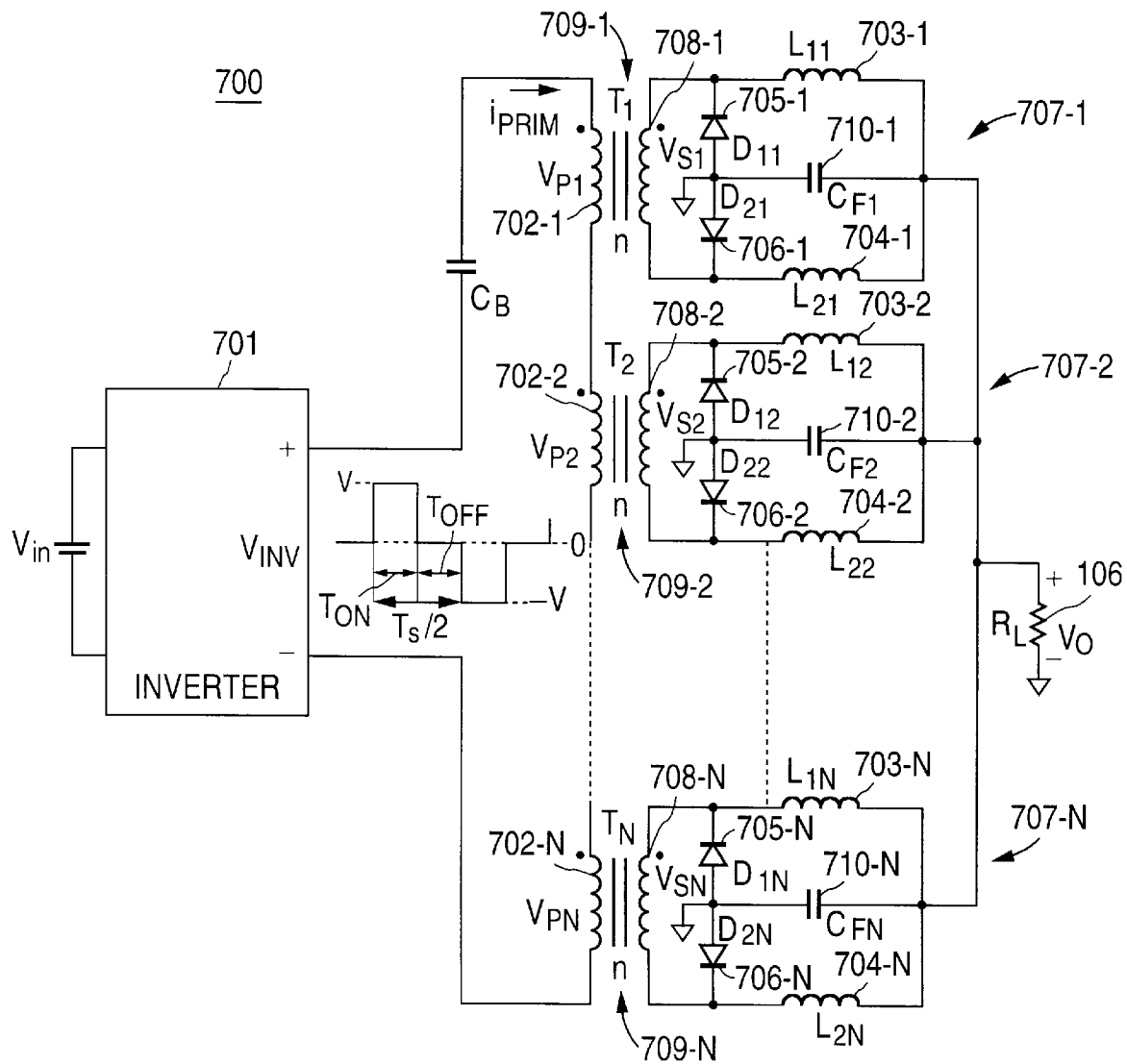
FIG. 7 shows, schematically, dc/dc converter 700, having an arbitrary number N of parallel rectifier stages, according to one embodiment of the invention.

FIG. 7 shows, schematically, dc/dc converter 700 that has an arbitrary number N of parallel rectifier stages 707-1 to 707-N, according to one embodiment of the invention. Dc/dc converter 700 uses inverter 701 to convert the dc input signal into a bipolar high-frequency square-wave signal that is applied across the series connection of primary windings 702-1 to 702-N of transformers 709-1 to 709-N. Inverter 701 can be implemented by virtually any converter topology, such as a forward converter, a two-switch forward converter, a half-bridge converter, or a full-bridge converter. As shown in FIG. 7, converter 700 has secondary windings 708-1 to 708-N of transformers 709-1 to 709-N each coupled to a respective one of current-doubler rectifiers 707-1 to 707-N. Current-doubler rectifiers 707-1 to 707-N are connected in parallel at the output terminals of converter 700. Of course, rectifiers 705-1 to 705-N and 706-1 to 706-N can be implemented by synchronous rectifiers, such as those discussed above with respect to FIG. 5.

Because primary windings 702-1 to 702-N of transformers 709-1 to 709-N are connected in series, a common current $i_{PRIM}$ flows in all primary windings 702-1 to 702-N (assuming that the primary windings of transformers 709-1 to 709-N have identical magnetizing inductances). Consequently, if each pair of corresponding primary and secondary windings has the same turns ratio, secondary currents $i_{SEC}$ in each of secondary windings 708-1 to 708-N are also the same, which ensures a perfect current (hence, power) sharing among rectifier stages 707-1 to 707-N. However, if the magnetizing inductances are different, secondary currents $i_{SEC}$ will also be different. Because the variation of magnetizing inductance can be easily kept within a narrow range, variations in magnetizing inductances do not significantly affect current sharing.

Figure 8:
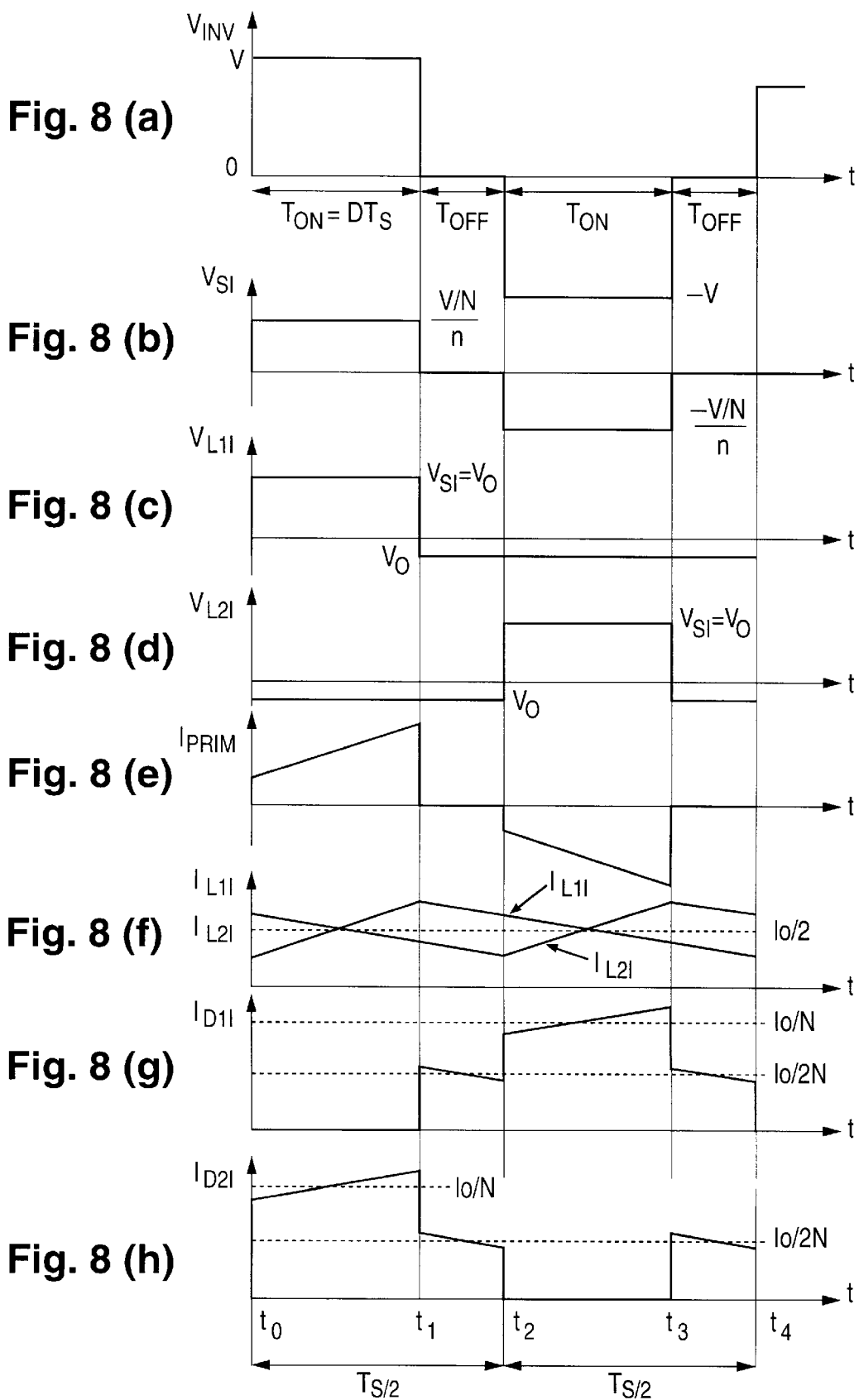
FIG. 8 shows key waveforms of converter 700 of FIG. 7, including (a) output voltage $V_{inv}$ of inverter 701; (b) secondary voltage $V_{si}$, representative of a secondary voltage at one of transformers 709-1 to 709-N; (c) voltage $V_{L1i}$, representative of a voltage across one of filter inductors 703-1 to 703-N; (d) voltage $V_{L2i}$, representative of a voltage across one of filter inductors 704-1 to 704-N; (e) primary current $i_{PRIM}$; (f) currents $i_{L1i}$ and $i_{L2i}$, representative of the respective currents in one of filter inductors 703-1 to 703-N and in one of filter inductors 704-1 to 704-N; (g) current $i_{D1i}$, representative of a current in one of rectifiers 705-1 to 705-N; (h) current $i_{D2i}$, representative of a current in one of rectifiers 706-1 to 706-N.

FIG. 8 shows representative key waveforms of converter 700 of FIG. 7. It should be noted that in FIG. 8 the symmetrical bipolar high-frequency voltage waveform at the output of the inverter implies that a symmetrical inverter topology (bridge-type topology) is assumed in the analysis that follows.

Ideally, when all components of rectifier stages 707-1 to 707-N are identical, the waveforms of signals in rectifier stages 707-1 to 707-N are identical. Thus, under ideal conditions, perfect current sharing is achieved, so that each rectifier stage carries 1/N of total load current $i_{LOAD}$. Under ideal conditions, primary voltage $V_{pi}$ across each of primary windings 702-1 to 702-N is 1/N input voltage V, or:

$$V_{P1}=V_{P2}=\ldots=V_{Pn}=V/N$$

Initially, as shown in FIG. 8 between time $t_0$ to $t_1$, voltage $V_{INV}$ of inverter 701 (magnitude V) is applied equally across each of primary windings 702-1 to 702-N, thus inducing positive voltage $V_{si}=n^*V/N$ across each of secondary windings 708-1 to 708-N, where n is the turns ratio across each corresponding pair of primary and secondary windings. (FIGS. 8(a), 8(b)) Consequently, rectifiers 705-1 to 705-N are each in an "off" state (FIG. 8(g)), carrying no appreciable current. At the same time, a positive voltage $V_{L1i}$ develops across each of inductors 703-1 to 703-N (FIG. 8(c)), thus increasing inductor current $i_{L1i}$ (FIG. 8(f)), which flows in the loop consisting of corresponding secondary windings 708-1 to 708-N, rectifier 706-1 to 706-N and filter capacitor 710-1 to 710-N. Because rectifiers 706-1 to 706-N conduct (FIG. 8(h)), voltage $V_{L2i}$ across inductors 704-1 to 704-N is negative and equals in magnitude to output voltage $V_o$ (FIG. 8(d)). As a result, inductor current $i_{L2i}$ in each of inductor 704-1 to 704-N is linearly decreasing (FIG. 8(f)).

Between time $t_1$ and $t_2$ (i.e., time interval $[t_1, t_2]$), voltage $V_{INV}$ of inverter 701 is zero (FIG. 8(a)), inductor current $i_{L1i}$ in each of inductors 703-1 to 703-N, which was flowing during time interval $[t_0, t_1]$ through corresponding secondary windings 708-1 to 708-N, continues to flow through rectifiers 705-1 to 705-N (FIGS. 8(f) and 8(g)). During time interval $[t_1, t_2]$, voltage $V_{L1i}$ or $V_{L2i}$ (FIGS. 8(c) and 8(d)) across each inductor—i.e., any of inductors 703-1 to 703-N and 704-1 to 704-N—is negative and equal to output voltage $V_o$. Consequently, current $i_{L1i}$ or $i_{L2i}$ in each inductor is decreasing linearly at the same rate (FIG. 8(f)).

During time intervals $[t_2, t_3]$ and $[t_3$ and $t_4]$, the output voltage $V_{INV}$ of inverter 701 is negative and zero, respectively. During these time intervals, the operations of converter 700 are identical to those of time intervals $[t_0, t_1]$ and time intervals $[t_1, t_2]$, except that the roles of inductors 703-1 to 703-N and rectifiers 705-1 to 705-N are exchanged with those of inductors 704-1 to 704-N and rectifiers 706-1 to 706-N.

Figure 9:
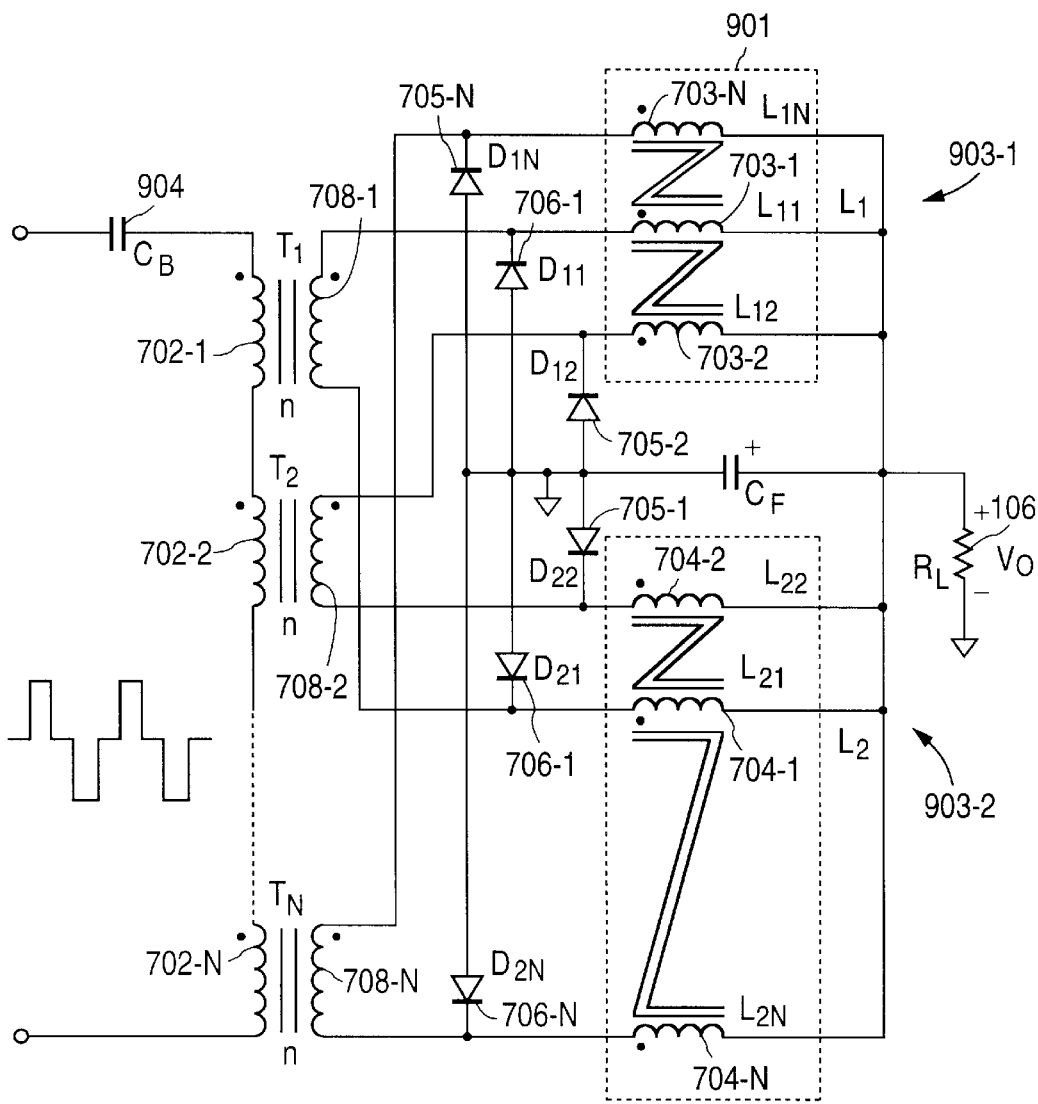
FIG. 9 shows converter 900 using magnetic coupling of output filters, in accordance with a second embodiment of the present invention.
Figure 10:
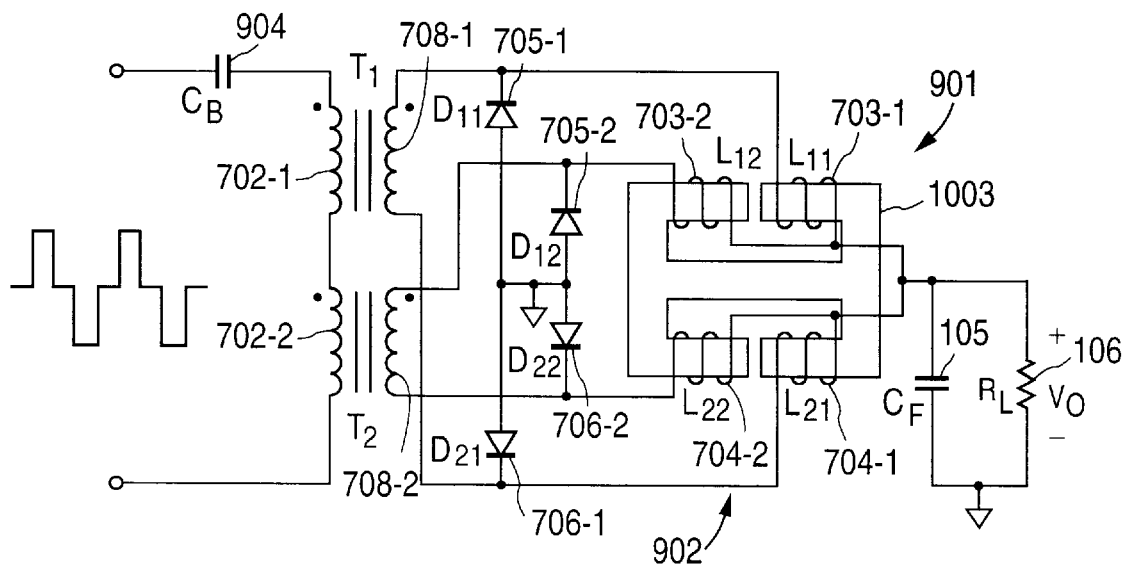
FIG. 10 shows an implementation of converter 900 of FIG. 9, using integrated magnetic components that has no magnetic coupling between filter inductors of the same rectifier stage.

In rectifier stages 707-1 to 707-N, because voltage $V_{L1i}$ across each of inductors 703-1 to 703-N is the same, inductors 703-1 to 703-N can be coupled, such as illustrated by coupled inductor 901 of converter 900 in FIG. 9. (Similarly, because voltage $V_{L2i}$ across each of inductors 704-1 to 704-N is the same, inductors 704-1 to 704-N can be coupled, such as also illustrated by coupled inductor 902 of converter 900 in FIG. 9) Using coupled inductors 901 and 902, the number of magnetic cores required to implement output filtering is reduced to two. Further reduction of the magnetic core count can be achieved by integrating coupled inductors 901 and 902 of FIG. 9 onto a single magnetic core, such as illustrated in FIG. 10 for converter 1000 with two converter stages. Of course, the same concept can be extended to any number of rectifier stages. In the integrated magnetic implementation of converter 1000 in FIG. 10, outer legs of EE core 1003 are gapped where the windings of coupled inductors 901 and 902 are placed. As shown in FIG. 10, the center leg of EE core 1003 has no gap and, therefore, has a much lower reluctance than the gapped outer legs. As a result, any flux generated in either of the outer legs is closed through the center leg (i.e., no coupling exists between opposite windings, so that there is no interaction between inductors 703-1 and 703-2 on one outer leg of EE core 1003 with inductors 704-1 and 704-2 on the other outer leg of EE core 1003).

Figure 11:
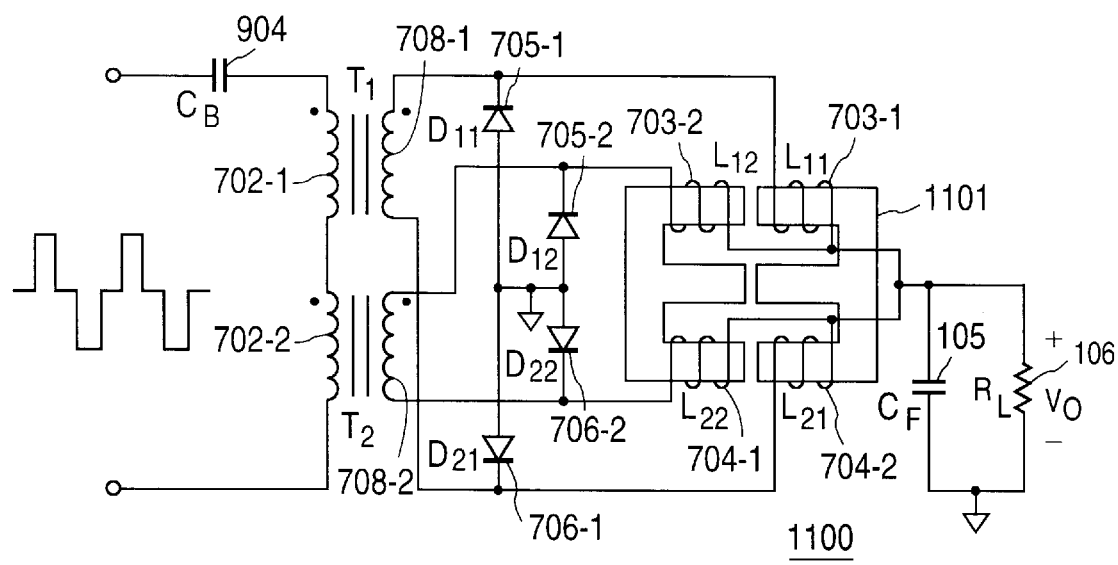
FIG. 11 shows another implementation of converter 900 of FIG. 9, using integrated magnetic components that has magnetic coupling between filter inductors of the same rectifier stage.

Alternatively, the magnetic integration of output filters can be also implemented by allowing a certain degree of coupling between filter inductors 703-1 and 703-2 wound on one leg of an EE core, and filter inductors 704-1 and 704-2 wound on the other leg of the EE core, as illustrated by EE core 1101 of converter 1100, shown in FIG. 11. In FIG. 11, the coupling between inductors 703-1, 703-2 and inductors 704-1 and 704-2 wound on two outside legs of EE core 1101 is achieved by gapping the middle leg of EE core 1101. Due to an increased reluctance of the gapped middle leg of EE core 1101, relative to EE core 1003 of FIG. 10, some flux that is generated in one outer leg of EE core 1101 is forced to flow in the other outer leg of EE core 1101, thus coupling all windings of inductors 703-1, 703-2. 704-1 and 704-2. When a proper amount of coupling is provided, the ripple in filter inductors 703-1, 703-2, 704-1 and 704-2 of converter 1100 is less than the corresponding filter inductors in converter 1000 of FIG. 10, thus improving converter performance.

Figure 12:
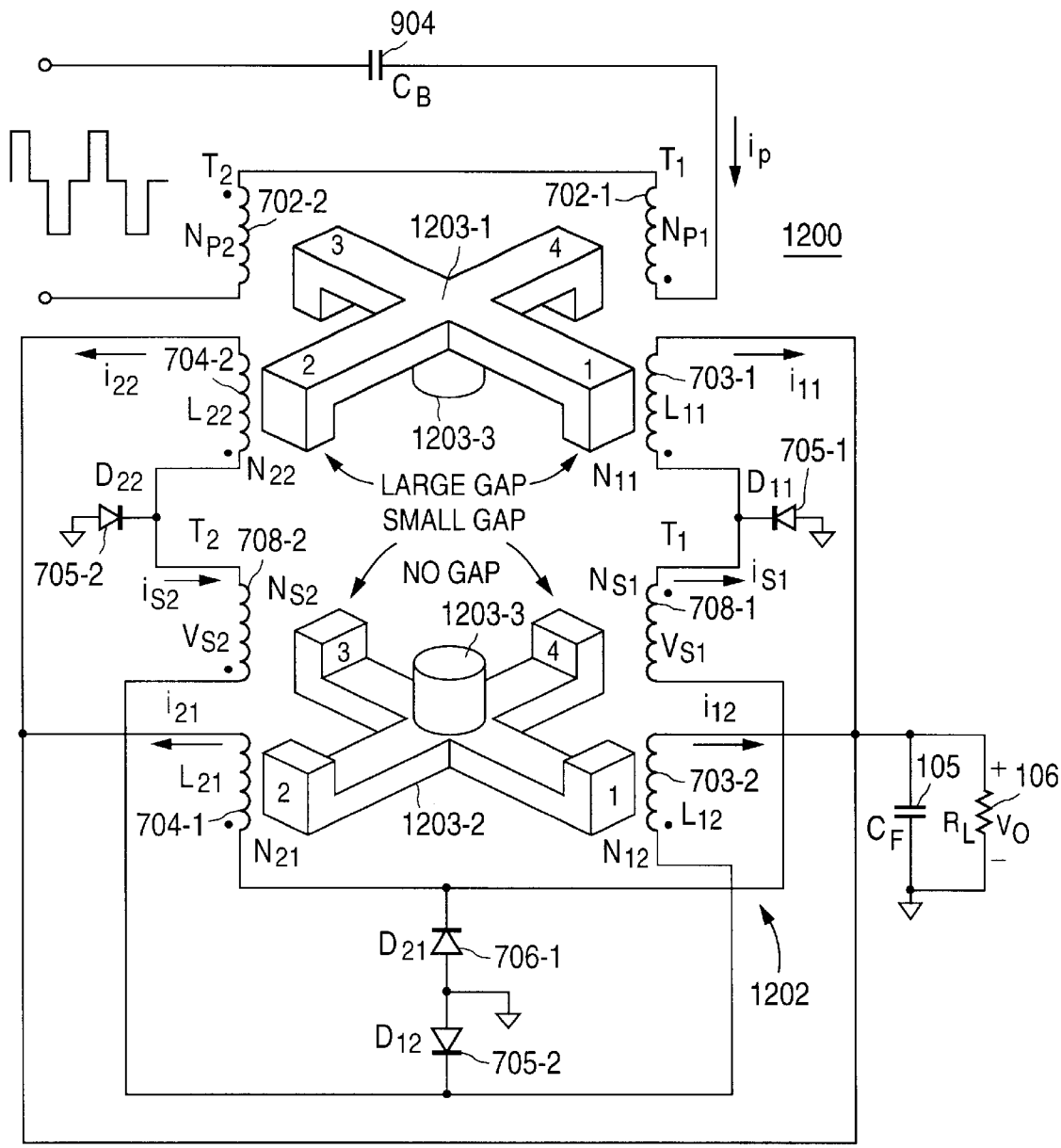
FIG. 12 shows converter 1200 with rectifiers 1201 and 1202, having integrated magnetic components on a single magnetic core (separation of core halves 1203-1 and 1203-2 is exaggerated for clarity).

Converter 900 of FIG. 9 can also be implemented using a single magnetic core, such as illustrated by converter 1200 of FIG. 12. In converter 1200, 4-legged X-type magnetic core 1203 is used. Note that, for illustrative purpose, core halves 1203-1 and 1203-2 are shown in FIG. 12 with an exaggerated separation. Actual separation between core halves 1203-1 and 1203-2 is typically a few millimeters, or less. In FIG. 12, core halves 1203-1 and 1203-2 implement coupled filter inductors 703-1, 703-2, 704-1, and 704-2 in the legs labeled "1" and "2". Transformer windings 702-1, 702-2, 708-1 and 708-2 are implemented on the legs labeled "3" and "4". To ensure correct operation of converter 1200, magnetic core 1203 is properly gapped, so that the fluxes created by the transformer windings are provided in the desired magnetic paths. To illustrate the gapping requirements, FIG. 13 shows reluctance circuit 1300 that models the magnetic structure of core 1203 of FIG. 12.

Generally, in an implementation such as converter 1200 of FIG. 12, a magnetic coupling between the transformers and the filter inductors is not desired. Because filter inductors are intended to store energy, legs 1 and 2 of EE core 1203 are gapped to create relatively large reluctances $R_1$ and $R_2$, which are represented in FIG. 13 by respective reluctances 1303 and 1306. In FIG. 13, inductors 703-1 and 703-2 in leg 1 of EE core 1203 are represented by voltage sources 1301 and 1302, respectively. Similarly, inductors 704-1 and 704-2 in leg 2 of core 1203 are represented in FIG. 13 by voltage sources 1305 and 1304. Because the transformers in converter 1200 are not intended to store energy, legs 3 and 4 need not be gapped. Reluctances in legs 3 and 4 are represented in FIG. 13 by reluctances 1312 and 1309, respectively. However, without a gap, reluctances $R_3$ and $R_4$ are relatively small (i.e., reluctance $R_3$ and $R_4$ would each be comparable to reluctance $R_c$ of non-gapped center post 1203-3, which is represented in FIG. 13 by reluctance 1313). Primary windings 702-1 and 702-2 are represented in FIG. 13 by voltage sources 1307 and 1310, respectively. Similarly, secondary windings 708-1 and 708-2 are represented in FIG. 13 by voltage sources 1308 and 1311. As a result of the relative reluctances of the transformers to those of the inductors, a part of fluxes $\Phi_1$ and $\Phi_2$ produced by inductor currents in legs 1 and 2 of core 1203 would flow through legs 3 and 4, in addition to the part of fluxes $\Phi_1$ and $\Phi_2$ flowing through center post 1203-3. The amount of this flux coupling between the transformer legs and the inductor legs depends on the ratio of reluctance $R_3$ or reluctance $R_4$ to center-post reluctance $R_c$. To minimize this coupling, reluctances $R_3$ and $R_4$ should be made much larger than reluctance $R_c$ by not having a gap in center post 1203-3, and by introducing small gaps in legs 3 and 4. The gaps in legs 3 and 4 are generally much smaller than the gaps in legs 1 and 2. In addition, when the air gaps are designed to achieve $R_c << R_3 = R_4 << R_1 = R_2$, flux linkage between legs 3 and 4 is also minimized (i.e., $\Phi_3$ and $\Phi_4$ corresponding to currents in legs 3 and 4 are coupled to low-reluctance center post 1203-3). As a result, currents in secondary windings 708-1 and 708-2 are each proportional to the respective current in primary windings 702-1 and 702-2 (i.e., the parallel current-doubler rectifiers 707-1 and 707-2 share load current $I_{LOAD}$ equally). Otherwise, i.e., when fluxes $\Phi_3$ and $\Phi_4$ in legs 3 and 4 are coupled, the currents in secondary windings 708-1 and 708-2 are not equal, even though the primary currents in 702-1 and 702-2 are the same, due to the internal impedance of each secondary circuit.

Figure 13:
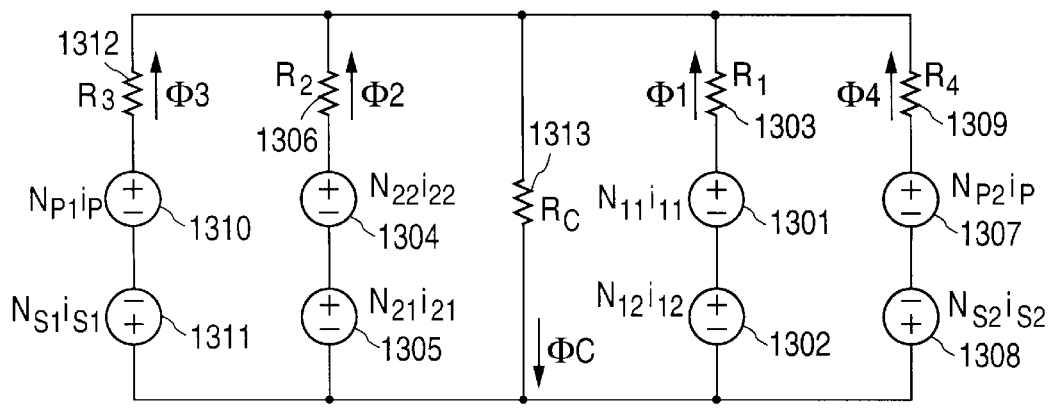
FIG. 13 shows a model of the magnetic reluctance circuit of converter 1200 of FIG. 12.
Figure 14:
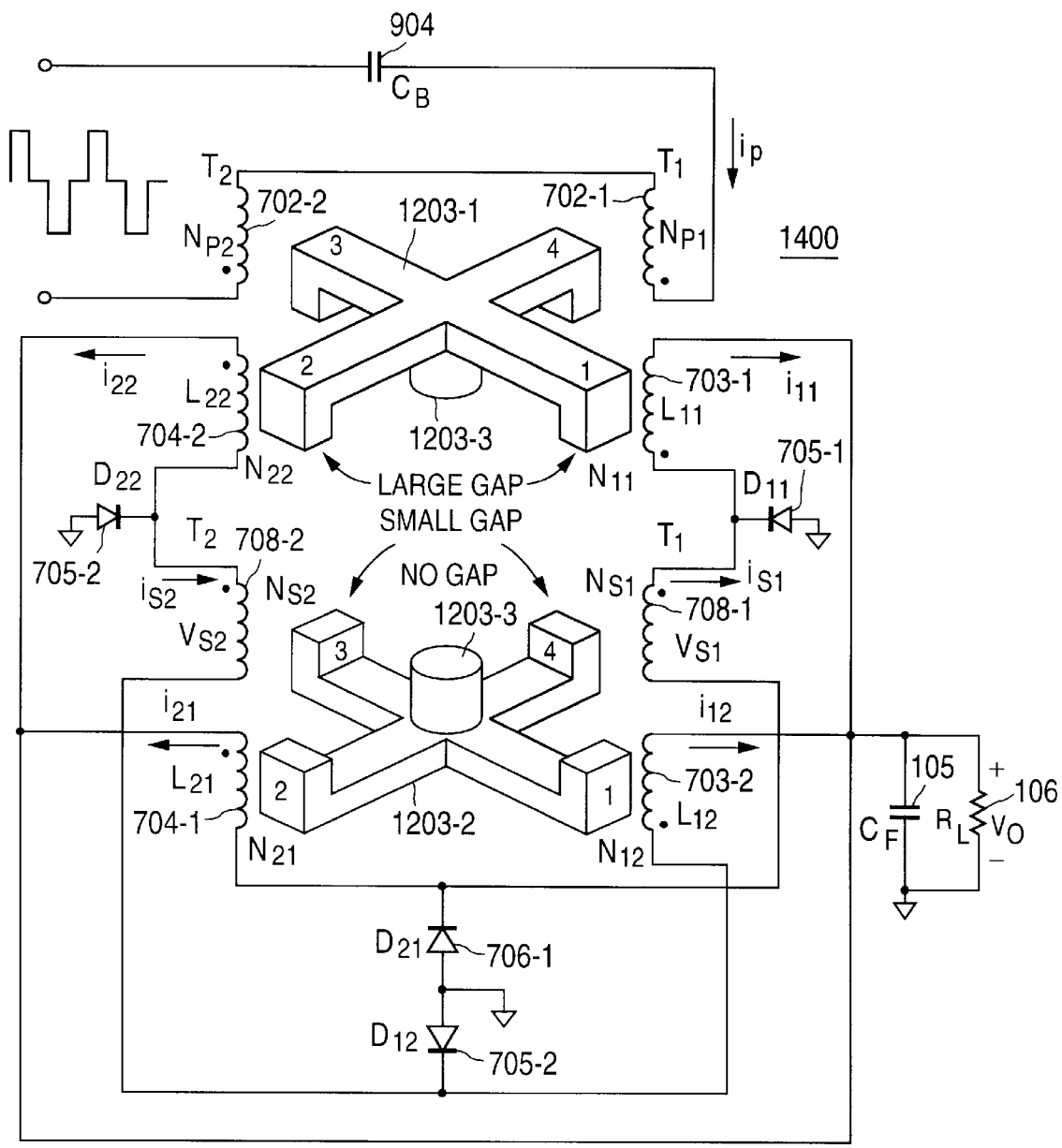
FIG. 14 shows converter 1300, which is an alternative implementation of converter 1200 of FIG. 12, using opposite winding orientations to reduce the magnetic flux through center post 1203-3. Note that the orientation of windings (dot positions) on legs 2 and 3 are opposite to the orientation of the corresponding windings in FIG. 12.

The flux in low-reluctance center post 1203-3, which is shown in FIG. 13 as being equal to the sum of the fluxes of legs 1–4, can be reduced by having opposite winding orientations in the windings of transformers in legs 3 and 4, and in the filter-inductor legs 1 and 2. FIG. 14 shows such a configuration in converter 1400. (Note the difference between the dot positions of the windings in FIGS. 12 and 14.) With opposite winding orientations, both fluxes $\Phi_3$ and $\Phi_4$ and fluxes $\Phi_1$ and $\Phi_2$ flow in opposite directions through center post 1203-3. As a result, the total flux $\Phi_c$ in un-gapped center post 1203-3 is reduced, thus relieving reducing the area in center post 1203-3 necessary to prevent saturation.

The integrated magnetic approach in FIGS. 10, 11, 12, and 14 can be applied to any number of rectifier stages, although the integrated magnetic components in FIGS. 12 and 14 may require custom-designed magnetic cores when more than two parallel rectifier stages are present, because each additional rectifier stage requires an additional leg. For an even number of rectifier stages, the converter can be implemented with a number of x-type cores, using an x-core to integrate each pair of rectifiers, as illustrated by converters 1200 and 1400 of FIGS. 12 and 14. Finally, converters 700, 900, 1000, 1100, 1200, and 1400 of FIGS. 7, 9, 10, 11, 12, and 14 can be implemented using synchronous rectifiers, rather than diode rectifiers.

The current-sharing performance of each of converters 700, 900 and 1000 was verified experimentally on a 200 kHz, 100 A/2.5 V prototype designed to operate from a 48-volt input. The prototype was implemented with a half-bridge inverter and two current-doubler rectifier stages. The measured full-load current-sharing performance and conversion efficiency are summarized in Table I.

TABLE I

Measured current-sharing performance and conversion efficiency of a 100-A/5-V prototype with two paralleled rectifier stages

| Implementation | First rectifier (i.e., rectifier 707-1) output current (A) | Second rectifier (i.e., rectifier 707-2) output current (A) | Efficiency (%) |
| --- | --- | --- | --- |
| Non-coupled inductors (e.g., converter 700 of FIG. 7) | 48.1 | 48.6 | 73.7 |
| Coupled inductors (e.g., converter 900 of FIG. 9) | 48.7 | 47.8 | 73.7 |
| Integrated Magnetics (e.g., converter 1000 of FIG. 10) | 49.3 | 48.1 | 73.6 |

The detailed description above is provided to illustrate specific embodiments of the present invention and is not intended to be limiting. Numerous variations and modifications within the scope of the present invention are possible. The present invention is set forth in the following claims.

We claim:

1. An isolated DC/DC converter, comprising:

an inverter stage including a plurality of transformers having their primary windings connected in series; and a plurality of parallel rectifier stages each including a filter inductor and each connected to a secondary winding of said transformer, wherein each said secondary winding corresponds to a respective one of said primary windings and wherein each filter inductor of said plurality of parallel rectifier stages is coupled to another filter inductor of said plurality of parallel rectifier stages.

2. An isolated DC/DC converter as in claim 1, wherein each of said rectifier stages comprises a current doubler.

3. An isolated DC/DC converter as in claim 1, wherein each of said secondary winding is related to said respective primary winding by a predetermined turns ratio.

4. An isolated DC/DC converter as in claim 2, wherein each parallel rectifier stage further comprises a second filter inductor.

5. An isolated DC/DC converter as in claim 4, further comprising a magnetic core wherein said first filter inductors of said parallel rectifier stages are coupled to each other, and wherein said second filter inductors of said parallel rectifiers stages are coupled to each other.

6. An isolated DC/DC converter as in claim 4, wherein said first and second filter inductors of said parallel rectifier stages are coupled to each other.

7. An isolated DC/DC converter as in claim 5, wherein said first and second filter inductors of said parallel rectifier stages are coupled to each other by virtue of the structure of said magnetic core.

8. An isolated DC/DC converter as in claim 4, wherein said first and second filter inductors of said parallel rectifier stages are isolated from each other.

9. An isolated DC/DC converter as in claim 4, wherein said first and second filter inductors of said parallel rectifier stages are isolated from each other by virtue of said magnetic core.

10. An isolated DC/DC converter as in claim 1, wherein said filter inductors and said primary and secondary windings of said transformer are provided on an integrated magnetic core.

11. An isolated DC/DC converter as in claim 10, wherein said integrated magnetic core comprises a center post.

12. An isolated DC/DC converter as in claim 11, wherein said center post of said integrated magnetic core is ungapped.

13. An isolated DC/DC converter as in claim 12, wherein said primary and secondary windings of each transformer are placed on a corresponding leg of said integrated magnetic core having a first air gap, and wherein said first and second inductors of each rectifier stage are placed on corresponding legs of said integrated magnetic core having a second air gap, said first air gap being smaller than said second air gap.

14. An isolated DC/DC converter as in claim 10, whereto said integrated magnetic core comprises of an X-shaped magnetic core.

15. An isolated DC/DC converter as in claim 13, wherein substantially equal number of said rectifier stages have the winding orientation of said transformer and inductor windings in the opposite directions to reduce the flux in said center post of said integrated magnetic core.

16. An isolated DC/DC converter as in claim 14, wherein said first rectifier stage has the opposite winding orientation of said transformer and inductor windings from the winding orientation of the corresponding windings of said second rectifier stage so that the flux in said center post of said integrated magnetic core is substantially reduced.

* * * * *